United States Patent [19]

Tanaka

[11] Patent Number: 4,913,288

[45] Date of Patent: Apr. 3, 1990

[54] CONTAINER FOR DENTAL X-RAY FILM PACKAGE

[75] Inventor: Hiroyuki Tanaka, Yokohama, Japan

[73] Assignee: Nix Company Ltd., Tokyo, Japan

[21] Appl. No.: 233,121

[22] Filed: Aug. 11, 1988

[30] Foreign Application Priority Data

Nov. 16, 1987 [JP] Japan ................................ 62-173853
Dec. 17, 1987 [JP] Japan ................................ 62-190779

[51] Int. Cl.$^4$ ............................................. B65D 85/48
[52] U.S. Cl. ..................................... 206/455; 433/229
[58] Field of Search ................. 206/455; 433/141, 229

[56] References Cited

U.S. PATENT DOCUMENTS

| 1,370,858 | 3/1921 | Tousey. | |
|---|---|---|---|
| 1,510,424 | 9/1924 | Tousey. | |
| 1,517,767 | 12/1924 | Tousey. | |
| 1,536,341 | 5/1925 | Hodgson | 206/455 X |
| 1,687,068 | 10/1928 | Hodgson | 206/455 X |
| 2,127,365 | 8/1938 | McHugh | 206/455 X |

OTHER PUBLICATIONS

US Magazine, "Jada", vol. 117, p. 349, (Aug. 1988).

Primary Examiner—Allen M. Ostrager
Attorney, Agent, or Firm—Wegner & Bretschneider

[57] ABSTRACT

A container for a dental X-ray film package which can prevent attachment of saliva of a patient to the dental X-ray film package contained therein. The container comprises a containing element formed from a flexible sheet for containing a dental X-ray film package therein, and a gripping element formed from at least one flexible sheet and connected to the containing element. The gripping element extends outwardly of an oral cavity of a patient when the containing element is inserted in the oral cavity. When an X-ray photograph is to be taken, a dental X-ray film package is inserted into the containing element and then the containing element is placed at a suitable position for photographing of a tooth. After X-ray photographing, the gripping element is gripped to take out the containing element from the oral cavity and pulls or tears off the gripping element in the opposite directions to open the containing element to take out the film package from the containing element. The film package thus taken out is free from saliva of the patient.

20 Claims, 5 Drawing Sheets

CONTAINER FOR DENTAL X-RAY FILM PACKAGE

BACKGROUND OF THE INVENTION

1. Field of the Invention

This invention relates to a container for a dental X-ray film package for containing therein a dental X-ray film package upon X-ray photographing of a tooth.

2. Description of the Prior Art

When an X-ray photograph of a tooth is taken, a dental X-ray film package is used wherein an X-ray film is enclosed in a packaging member or cover which transmits an X-ray but does not transmit a visible ray therethrough. An exemplary one of such conventional dental X-ray film packages will be described below with reference to FIG. 1 of the accompanying drawings.

The dental X-ray film package shown includes a packaging member or cover 1 made of an opaque flexible material such as a synthetic resin. The cover 1 transmits an X-ray but does not transmit a visible ray therethrough. An X-ray film 2 is enclosed in the cover 1.

When an X-ray photograph of a tooth is to be taken, the dentist inserts the dental X-ray film package into the oral cavity of a patient and contacts it with the tooth for an object of photographing, and then an X-ray is irradiated from the opposite side of the dental X-ray film package. Consequently, an X-ray latent image of the tooth is produced on the X-ray film 2. The dentist then takes out the dental X-ray film package from the oral cavity of the patient, breaks the cover 1 either in a dark room or in a camera, takes out the X-ray film 2 from the cover 1 and effects development of the X-ray film 2. As a result, a visible X-ray image of the tooth for an object of photographing is produced on the X-ray film 2. The dentist will thus conduct diagnosis and/or treatment depending upon the X-ray image on the X-ray film.

Again, when an X-ray photograph is to be taken, the dentist makes a series of operations to insert a dental X-ray film package into the oral cavity of a patient, take out the dental X-ray film package from the oral cavity, and break the cover 1 and take our the X-ray film from the cover 1 in order to develop the X-ray film as described above. It cannot be avoided, therefore, that saliva of the patient attaching in a large amount of the dental X-ray film package attaches also to the dentist. Such attachment of saliva not only makes the dentist feel disagreeable but also may possibly cause such a trouble that, in case the dentist has a wound at a tooth thereof, a virus in the saliva may invade via the wound so that the dentist himself or herself may fall ill.

SUMMARY OF THE INVENTION

It is an object of the present invention to provide a container for a dental X-ray film package which can prevent attachment of saliva of a patient to the dental X-ray film package contained therein.

In order to attain the object, according to the present invention, a container for a dental X-ray film package comprises a containing element formed from a flexible sheet for containing a dental X-ray film package therein, and a gripping element formed from at least one flexible sheet and connected to the containing element, the gripping element extending outwardly of an oral cavity of a patient when the containing element is inserted in the oral cavity.

With the container for a dental X-ray film package according to the present invention, when an X-ray photograph is to be taken, the dentist inserts a dental X-ray film package into the containing element through an opening and then places the containing element at a predetermined position of a tooth for an object of photographing of a patient. After irradiation of an X-ray, the dentist grips the gripping element to take out the containing element from the oral cavity of the patient and pulls or tears off the gripping element in the opposite directions to open the containing element. Consequently, the dental X-ray film package drops or can be taken out of the containing element. The dental X-ray film package thus taken out is free from saliva of the patient. The dental X-ray film package will then be stripped off at a dark place to take out the X-ray film, and the X-ray film will be processed for development.

The above and other objects, features and advantages of the present invention will become apparent from the following description and the appended claims, taken in conjunction with the accompanying drawing.

DESCRIPTION OF THE PREFERRED EMBODIMENTS

Figure 1:
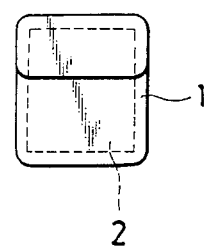
FIG. 1 is a plan view of a dental X-ray film package.
Figure 2A:
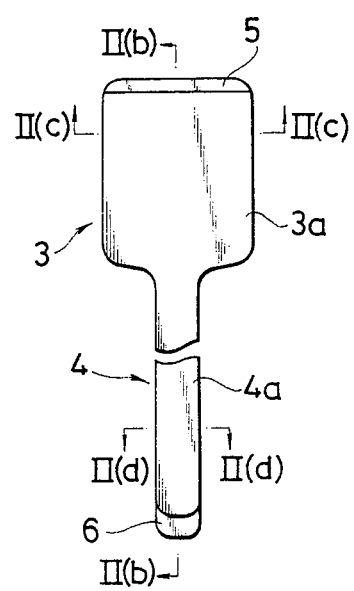
FIG. 2(a) is a plan view of a container for a dental X-ray film package showing a first embodiment of the present invention.
Figure 2B:
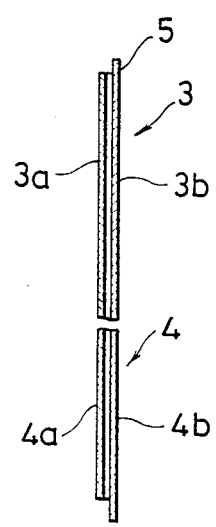
FIGS. 2(b), 2(c) and 2(d) are sectional views taken along lines IIb—IIb, IIc—IIc and IId—IId, respectively, of FIG. 2(a)
Figure 2C:
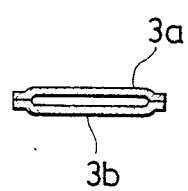
Figure 2D:
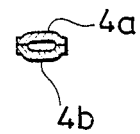

Referring first to FIGS. 2(a) to 2(d), there is shown a container for a dental X-ray film package according to a first embodiment of the present invention. The container shown includes a containing portion 3 in the form of a bag formed from a pair of sheets 3a and 3b which are welded to each other along edges thereof except upper edges in FIG. 2(a). The sheets 3a and 3b are each made of a soft or flexible synthetic resin which transmits an X-ray therethrough and naturally is not permeable to water nor saliva. The container further includes a gripping portion 4 formed from a pair of sheets 4a and 4b contiguous to the sheets 3a and 3b, respectively, of the containing portion 3. The sheets 4a and 4b are smaller in width but greater in length than the sheets 3a and 3b, and the opposite longitudinal edges thereof are welded to each other. The sheet 3b of the containing portion 3 extends at the unwelded end thereof a little farther than the other sheet 3a to form a tongue piece 5 to which a bonding agent is applied. The sheet 4b of the gripping portion 4 also extends at the other end thereof a little further than the other sheet 4a to form a pinching portion 6.

When an X-ray photograph is to be taken, the dentist inserts a dental X-ray film package into the containing portion of the container through the opening at the unwelded end of the containing portion 3 adjacent the tongue piece 5. The tongue piece 5 of the container is then folded on and adhered to the sheet 3a of the containing portion 3, thereby closing the open end of the containing portion 3. As a result, the dental X-ray film package contained in the containing portion 3 will not come off from the container. Subsequently, the dentist places the containing portion 3 of the container at a predetermined position of a tooth for an object of photographing in the oral cavity of a patient using college pliers or some other like tool or by hand or else the patient itself may place the containing portion 3 in position. In this condition, the gripping portion 4 of the container extends outwardly of the mouth of the patient. Then, an X-ray is irradiated from the other side of the containing portion 3 of the container so that an X-ray latent image of the tooth is produced on the X-ray film in the dental X-ray film package in the containing portion 3.

Figure 3A:
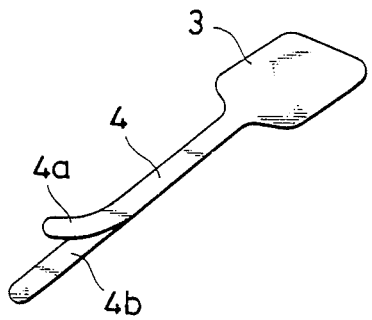
FIGS. 3(a) and 3(b) are perspective views of the container shown in FIG. 2(a)
Figure 3B:
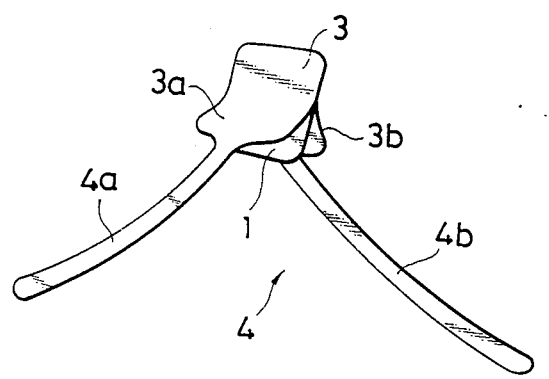

After completion of such photographing, the dentist grips at the gripping portion 4 of the container and takes out the containing portion 3 of the container from the oral cavity of the patient. After then, the dentist pinches the pinching portion 6 of the sheet 4b with one hand thereof and an end portion of the sheet 4a with the other hand thereof and pulls them to the opposite sides away from each other. Consequently, the sheets 4a and 4b of the gripping portion 4 are torn off from each other along the welded edges thereof. Such conditions are illustrated in FIGS. 3(a) and 3(b). In particular, end portions of the sheets 4a and 4b of the gripping portion 4 are shown torn off from each other in FIG. 3(a). If the sheets 4a and 4b are further torn off to and farther than the connecting portion between the gripping portion 4 and the containing portion 3, then the sheets 3a and 3b of the containing portion 3 are torn off along the welded edges thereof as seen in FIG. 3(b). As the sheets 3a and 3b are torn off in this manner, finally the dental X-ray film package drops off from the containing portion 3 of the container. The dental X-ray film package thus dropped is not wet with saliva of the patient because it has been enclosed within the containing portion 3 of the container. The dental X-ray film package is put into a dark room or a camera in which the packaging member or cover 1 of the package is broken and the X-ray film 2 is taken out of the package and processed for development. As a result, an X-ray image of the tooth is produced on the X-ray film 2.

It is to be noted that while in the present embodiment the containing portion of the container is described sealed by the bonding agent applied to the tongue piece adjacent the opening of the containing portion through which the dental X-ray film package is inserted into the containing portion, the bonding agent need not necessarily be applied over the entire area of the tongue piece but may be applied to several required spots on the tongue piece.

Also, the tongue piece need not necessarily have a bonding agent applied thereto but otherwise may be formed as a tuck-in portion folded into the containing portion of the container after a dental X-ray film package is inserted into the containing portion.

Further, where the containing portion of the container is dimensioned such that a dental X-ray film may be contained closely therein without the possibility of coming off therefrom, the tongue piece need not necessarily be provided on the container; absence of the tongue piece will hardly allow saliva of a patient to invade into the containing portion through the opening of the containing portion and will thus cause a handling person to have a disagreeable feeling.

Further, while in the present embodiment the gripping portion of the container is described welded along the edges thereof, the sheets of the gripping portion may otherwise be adhered at suitable spots to each other by means of a bonding agent having a low adhesive strength.

In addition, the sheets of the gripping portion need not be adhered to each other, and there is no trouble if they are separate from each other. In this instance, the two sheets may be equal or different in length.

In this manner, with the container according to the present embodiment, a dental X-ray film package is contained in the containing portion of the container, and after X-ray photographing, the gripping portion is gripped to drawn out the containing portion of the container from the oral cavity of the patient, and then the gripping portion and the containing portion of the container are torn off to take out the dental X-ray film package from the container in order to subsequently effect development of the X-ray film of the dental X-ray film package. Accordingly, attachment of saliva of the patient to the dentist can be prevented with certainty. Further, where the material of the containing portion of the container, which can be selected arbitrarily, is a sheet of synthetic resin which is softer or more flexible than the dental X-ray film package, the disagreeable feeling of the patient is moderated comparing with the dental X-ray film package which is directly put into the oral cavity of the patient.

Figure 4:
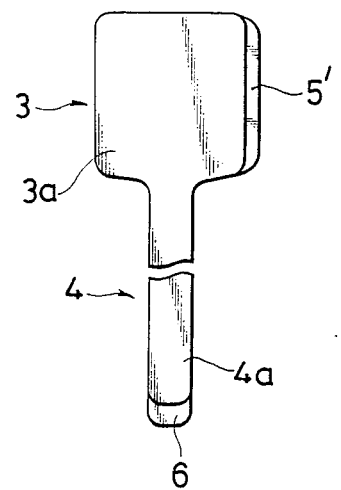
FIG. 4 is a plan view of a container of a dental X-ray film package showing a second embodiment of the present invention.
Figure 5A:
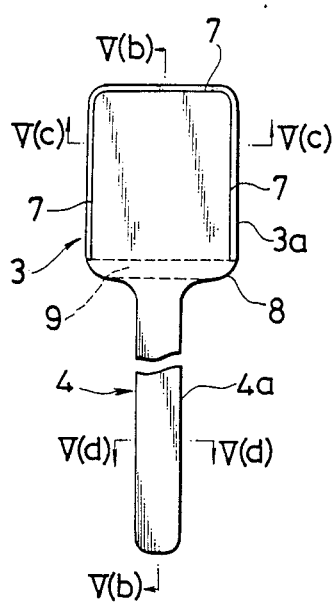
FIG. 5(a) is a plan view of a container for a dental X-ray film package showing a third embodiment of the present invention.
Figure 5B:
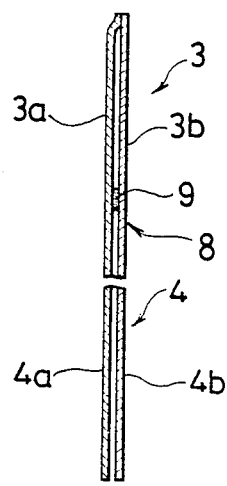
FIGS. 5(b), 5(c) and 5(d) are sectional views taken along lines Vb—Vb, Vc—Vc and Vd—Vd, respectively, of FIG. 5(a)
Figure 5C:
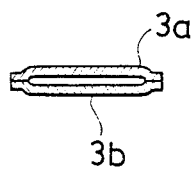
Figure 5D:
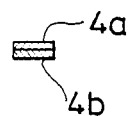

Referring now to FIG. 4, there is shown a container for a dental X-ray film package according to a second embodiment of the present invention. It is to be noted that like parts or elements are denoted by like reference symbols to those of the first embodiment shown in FIGS. 2(a) to 2(d) and overlapping description thereof is omitted to avoid redundancy (this similarly applies to description of the following embodiments of the present invention). The container of the present embodiment is generally similar in construction to the container of the first embodiment shown in FIGS. 2(a) to 2(d) and is different from the latter only in that a tongue piece 5' corresponding to the tongue piece 5 in the first embodiment is provided at a different location, that is, at a right side end in FIG. 4 of a containing portion 3 while the tongue piece 5 in the first embodiment is provided at the upper end in FIG. 2(a) of the containing portion 3. The containing portion 3 is thus open at the side end thereof adjacent the tongue piece 5'. Accordingly, the container of the present embodiment is used in a similar manner to that of the container of the first embodiment described hereinabove except that a dental X-ray film package is inserted into the containing portion 3 thereof through the opening at the side end of the containing portion 3.

Also in the case of the container of the present embodiment, the tongue piece may have a bonding agent applied at spots thereon or else have no bonding agent applied thereto similarly as described hereinabove in connection with the container of the first embodiment. Or else, the tongue piece itself may be omitted. Further, two sheets of a gripping portion may be adhered at spots to each other or else may be left separate from each other without adhering them.

The container of the present embodiment thus exhibits similar effects to those of the container of the first embodiment described hereinabove.

Referring now to FIGS. 5(a) to 5(d), there is shown a container for a dental X-ray film package according to a third embodiment of the present invention. The container shown includes a containing portion 3 in the form of a bag wherein a pair of sheets 3a and 3b are welded to each other along edges thereof except lower edges in FIG. 5(a). Such a welded portion is denoted at 7. The sheets 3a and 3b thus define an opening 8 at the unwelded lower end in FIG. 5(a) of the containing portion 3. A bonding agent layer 9 is applied to a portion of one or each of the sheets 3a and 3b adjacent the opening 8 of the containing portion 3. The bonding agent layer 9 may be formed from a bonding agent having a very small adhesive strength.

When X-ray photographing is to be conducted, the dentist pulls a pair of sheets 4a and 4b of a gripping portion 4 to the opposite sides of the container to open the opening 8 and inserts a dental X-ray film package into the containing portion 3 via the opening 8. In this instance, since the bonding agent layer 9 has a small adhesive strength, the opening 8 can be opened readily. After such insertion of the dental X-ray film package, the containing portion 3 is pressed at and around the opening 8 thereof to press the sheets 3a and 3b thereof against each other to adhere the sheets 3a and 3b to each other with the bonding agent layer 9 thereby to close the opening 8 of the containing portion 3. As a result, the dental X-ray film package enclosed in the containing portion 3 will no more come off from the container and no saliva will be admitted into the containing portion 3 at all.

Figure 6:
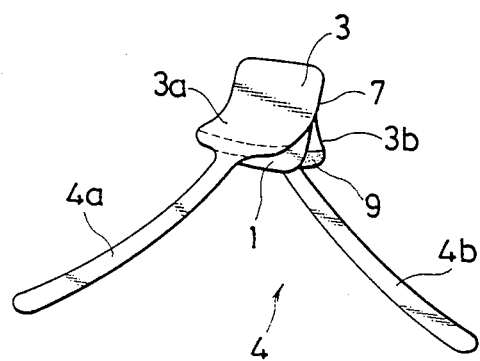
FIG. 6 is a perspective view of the container shown in FIG. 5(a)

After completion of photographing, the dentist grips the gripping portion 4 of the container and takes out the containing portion 3 of the container from the oral cavity of the patient. After then, the dentist pinches the sheet 4a with one hand and the other sheet 4b with the other hand and pulls them away from each other so that the bonding agent layer 9 is separated from the sheet 4a or 4b and the opening 8 is opened again. As the sheets 4a and 4b are further pulled away from each other, the welded portions 7 of the containing portion 3 are torn off. Such a condition is illustrated in a perspective view of FIG. 6. As the sheets 4a and 4b are further pulled away from each other, the dental X-ray film package will finally drop from the containing portion 3 of the container.

Also in the case of the container of the present embodiment, the bonding agent may otherwise be applied at spots to the sheet or sheets of the containing portion thereof near the opening or else no bonding agent may be applied to the sheet or sheets of the containing portion as described hereinabove in connection with the container of the first embodiment. A dental X-ray film package is enclosed in the containing portion of the container, and no saliva will be admitted into the containing portion. Also, the two sheets of the gripping portion may be adhered at spots to each other with a bonding agent having a small adhesive strength.

Since the container of the present embodiment exhibits similar effects to those of the container of the first embodiment described hereinabove and can be formed by welding except the connecting portion of the containing portion of the gripping portion thereof, the containing portion thereof can be formed into a shape which is rounded at corners thereof and thus has no angle thereon. Accordingly, the disagreeable feeling of a patient can be moderated.

Figure 7A:
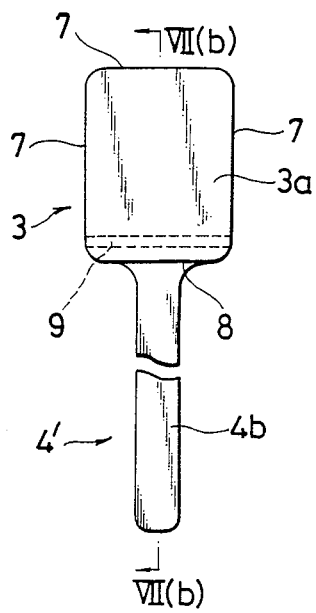
FIGS. 7(a) and 7(b) are a plan view and a longitudinal sectional view of a container for a dental X-ray film package showing a fourth embodiment of the present invention.
Figure 7B:
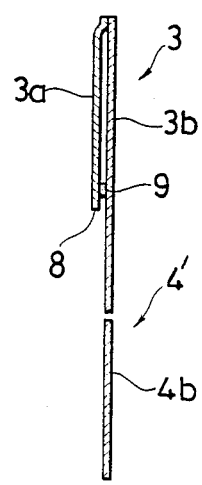

Referring now to FIGS. 7(a) and 7(b), there is shown a container for a dental X-ray film package according to a fourth embodiment of the present invention. The container of the present embodiment is similar in construction to the container of the third embodiment shown in FIGS. 5(a) to 5(c) and is only different from the latter in that a gripping portion 4' thereof is composed of a single sheet 4b while the gripping portion 4 of the container of the third embodiment is composed of the two sheets 4a and 4b. Each of the sheet 4b of the gripping portion 4 and a pair of sheets 3a and 3b of a containing portion 3 of the container in the present embodiment is formed from a sheet of a synthetic resin material having a tearing directivity in the direction along the gripping portion 4' of the container.

When the container is to be used, a bonding agent layer 9 is at first separated from the sheet 3a or 3b to open an opening 8 of the containing portion 3 of the container, and then a dental X-ray film package is inserted into the containing portion 3 through the opening 8 whereafter the opening 8 is closed with the bonding agent layer 9. Then, after completion of photographing, the dentist grips the gripping portion 5' and draws out the containing portion 3 of the container from the oral cavity of the patient, and then the sheet 4b is torn off with both hands of the dentist. Consequently, the sheet 4b is torn off along the longitudinal length thereof to the sheet 3b so that the sheet 3b is also torn off in the same direction. As a result, the dental X-ray film package drops out of the containing portion 3 of the container thus torn off.

It is to be noted that, similarly as in the preceding embodiments, the bonding agent may be applied at spots or else no bonding agent layer may be provided.

The container of the present embodiment exhibits similar effects to those of the container of the third embodiment described hereinabove and an additional effect that it is simplified in construction.

Figure 8:
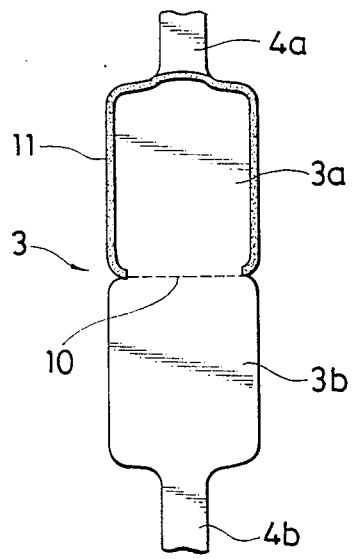
FIGS. 8, 9 and 10 are plan views of containers for a dental X-ray film package showing fifth, sixth and seventh embodiments of the present invention, respectively.

FIG. 8 shows a container for a dental X-ray film package according to a fifth embodiment of the present invention. Referring to FIG. 8, the container shown has a generally similar construction to those of the containers of the first to third embodiments described above and is different from the latter in that it has a developed configuration of any of the containers of the preceding embodiments. In particular, a pair of continuous sheets 3a and 3b to form a containing portion 3 of the container lie in a same plane and are folded, when the container is to be used, along a line 10. A bonding agent layer 11 of a small adhesive strength is applied along three edges of the sheet 3a except an edge on the line 10. When the container is to be used, a dental X-ray film package is at first placed on the sheet 3a, and then the other sheet 3b is folded along the line 10 onto the sheet 3a whereafter the containing portion 3 of the container is pressed along the circumferential edges of the sheet 3a. Consequently, the sheets 3a and 3b which form symmetrically configured halves with respect to the folding line 10 are adhered to each other by the bonding agent layer 11 to complete the containing portion 3 in the form of a bag in which the dental X-ray film package is enclosed. The manner of use and effects of the container of the present embodiment are similar to those of the containers of the first to third embodiments described hereinabove.

Figure 9:
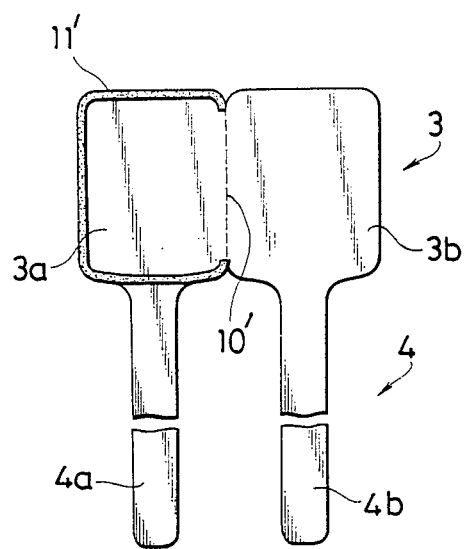

Referring now to FIG. 9, there is shown a container for a dental X-ray film package according to a sixth embodiment of the present invention. The container of the present embodiment is similar to the container of the fifth embodiment shown in FIG. 8 in that it has a developed configuration. In particular, a pair of continuous sheets 3a and 3b to form a containing portion 3 of the container lie in a same plane and are folded, when the container is to be used, along a line 10'. The container of the present embodiment is different, however, from the container of the fifth embodiment in a manner of development thereof. More particularly, the folding line 10' extends along a side edge of the container to be formed, that is, along a left side edge of the sheet 3b along which the sheets 3a and 3b are integrally connected to each other while the folding line 10 in the container of the fifth embodiment extends along an upper edge in FIG. 8 of the sheet 3b. A bonding agent layer 11' of a small adhesive strength is thus applied along three edges of the sheet 3a except a right edge in FIG. 9 on the line 10. The process of enclosing a dental X-ray film package in the containing portion 3, the manner of use and the effects of the container of the present embodiment are similar to those of the container of the fifth embodiment described hereinabove.

Figure 10:
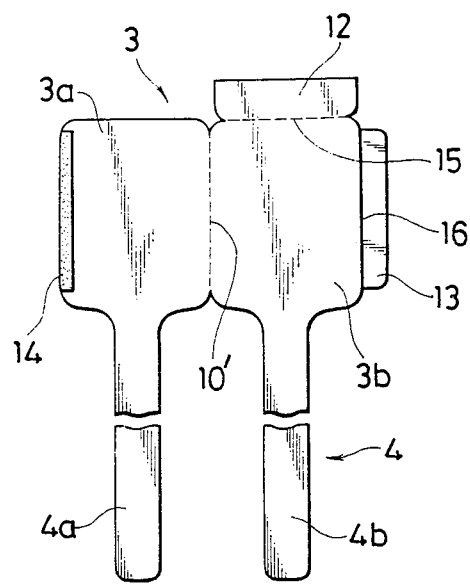

FIG. 10 shows a container for a dental X-ray film package according to a seventh embodiment of the present invention. Referring to FIG. 10, the container shown has a generally similar construction to that of the container of the sixth embodiment shown in FIG. 9 and is different from the latter in that two tuck-in portions 12 and 13 are provided along an upper edge and a right edge of a sheet 3b and a bonding agent layer 14 of a small adhesive strength is applied only along a left edge of the other sheet 3a. When the container is to be used, at first a dental X-ray film package is placed on the sheet 3b, and then the tuck-in portions 12 and 13 are folded on the sheet 3b along folding lines 15 and 16, respectively. Subsequently, the sheet 3a is folded along a folding line 10' between the sheets 3a and 3b and is pressed against the sheet 3b along the bonding agent layer 14. Consequently, the dental X-ray film package is enclosed in the containing portion 3 of the container. The manner of use and the effects of the container of the present embodiment are similar to those of the container of the sixth embodiment described hereinabove.

Description has been given so far of the several embodiments of the present invention. While various materials may be selectively employed for the sheets of the embodiments, sheets of a soft or flexible material such as, for example, polystyrene are particular effective. In particular, the packaging member or cover of an X-ray film package is limited in material and hence in flexibility due to the necessity for interruption of light and also for protection of an X-ray film. Due to such lack in flexibility, the film package often gives a disagreeable feeling to a patient when it is inserted into the oral cavity of the patient. However, where the sheets are made of a material which is further softer or more flexible than that of the packaging member or cover of the film package, the disagreeable feeling of the patient can be moderated remarkably. Further, paper which can be exfoliated may naturally be employed for the bonding agent layer for the containing portion of the container.

As apparent from the foregoing description, according to the present invention, a container for a dental X-ray film package comprises a containing element and a gripping element. When the container is to be used, a dental X-ray film package is enclosed into the containing element of the container, and the containing element is placed in position in the oral cavity of a patient. After completion of photographing, the gripping element is gripped to take out the containing element from the oral cavity. In preparation for development of an X-ray film, the gripping element and the containing element are torn off to take out the dental X-ray film package from the containing element of the container whereafter the X-ray film is taken out of the dental X-ray film package. Accordingly, the dental X-ray film package is free from saliva of the patient and hence the dentist can be prevented from getting wet with saliva of the patient.

What is claimed is:

1. A container for a dental X-ray film package, comprising a containing element formed from flexible sheet material for containing a dental X-ray film package therein, and a gripping element formed from at least one flexible sheet and extending from said containing element at a contiguous edge portion, said gripping element extending outwardly from an oral cavity of a patient when said containing element is inserted in the oral cavity.

2. A container for a dental X-ray film package as recited in claim 1, wherein said containing element includes an opening located along an edge portion of said containing element, for allowing insertion of the dental X-ray film package into said containing element therethrough.

3. A container for a dental X-ray film package as recited in claim 2, wherein said opening is located at an edge portion along said containing element other than said contiguous edge portion.

4. A container for a dental X-ray film package as recited in claim 3, wherein said containing element includes a tongue piece extending along said edge portion whereat said opening is located.

5. A container for a dental X-ray film package as recited in claim 4, wherein said containing element includes a bonding agent applied along said edge portion whereat said opening is located.

6. A container for a dental X-ray film package as recited in claim 5, wherein said gripping element comprises a pair of sheets.

7. A container for a dental X-ray film package as recited in claim 6, wherein said edge portion whereat said opening is located is opposite said contiguous edge portion.

8. A container for a dental X-ray film package as recited in claim 2, wherein said opening is located at an edge portion which includes said contiguous edge portion.

9. A container for a dental X-ray film package as recited in claim 2, wherein said containing element includes a bonding agent applied along said edge portion whereat said opening is located.

10. A container for a dental X-ray film package as recited in claim 9, wherein said gripping element comprises a pair of sheets.

11. A container for a dental X-ray film package as recited in claim 2, wherein said gripping element comprises a pair of sheets.

12. A container for a dental X-ray film package as recited in claim 11, wherein said gripping element further comprises an adhesive means for partially adhering said sheets to each other.

13. A container for a dental X-ray film package as recited in claim 11, wherein said sheets of said gripping element are unequal in length, with one of the sheets extending further than the other sheet to form a pinching portion.

14. A container for a dental X-ray film package as recited in claim 1, wherein said gripping element comprises a pair of sheets.

15. A container for a dental X-ray film package as recited in claim 14, wherein said gripping element further comprises an adhesive means for partially adhering said sheets to each other.

16. A container for a dental X-ray film package as recited in claim 14, wherein said pair of sheets are separate from each other.

17. A container for a dental X-ray film package as recited in claim 14, wherein said sheets of said gripping element are unequal in length, with one of the sheets extending further than the other sheet to form a pinching portion.

18. A container for a dental X-ray film package as recited in claim 1, wherein said gripping element is formed from a single flexible sheet having a tearing directivity in the direction along said gripping element.

19. A container for a dental X-ray film package as recited in claim 1, wherein said containing element is formed from a single sheet having (a) a folding line, (b) two symmetrically configured halves with respect to said folding line each having peripheral edges, and (c) a bonding agent layer along the peripheral edges of one of the symmetrical halves.

20. A container for a dental X-ray film package as recited in claim 1, wherein said containing element is formed from a single sheet having (a) a folding line, (b) two symmetrically configured halves with respect to said folding line each having peripheral edges, (c) a tuck-in portion at each of the peripheral edges of one of the symmetrical halves, and (d) a bonding agent layer along one of said peripheral edges of the other one of the symmetrical halves.

* * * * *